(12) United States Patent
Yamasaki (10) Patent No.: US 9,031,770 B2
(45) Date of Patent: May 12, 2015

(54) DISPLAY DEVICE FOR VEHICLE

(71) Applicant: Fuji Jukogyo Kabushiki Kaisha, Tokyo (JP)

(72) Inventor: Mahiro Yamasaki, Tokyo (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 14/103,358

(22) Filed: Dec. 11, 2013

(65) Prior Publication Data

US 2014/0172284 A1 Jun. 19, 2014

(30) Foreign Application Priority Data

Dec. 13, 2012 (JP) ................................. 2012-271865

(51) Int. Cl.

| | |
|---|---|
| *B60W 50/14* | (2012.01) |
| *B60Q 1/00* | (2006.01) |
| *G01L 3/26* | (2006.01) |
| *B60K 35/00* | (2006.01) |
| *B60W 10/06* | (2006.01) |
| *B60W 10/08* | (2006.01) |
| *B60W 20/00* | (2006.01) |
| *G07C 5/08* | (2006.01) |

(52) U.S. Cl.
CPC ............... *B60W 50/14* (2013.01); *B60W 10/06* (2013.01); *B60W 10/08* (2013.01); *B60W 20/00* (2013.01); *Y10S 903/93* (2013.01); *B60K 2350/1092* (2013.01); *G07C 5/085* (2013.01); *B60K 35/00* (2013.01); *B60W 2050/146* (2013.01); *G01L 3/26* (2013.01); *B60Q 1/00* (2013.01)

(58) Field of Classification Search
None
See application file for complete search history.

(56) References Cited

U.S. PATENT DOCUMENTS

| | | | |
|---|---|---|---|
| 6,253,129 B1 * | 6/2001 | Jenkins et al. ............... 701/32.3 |
| 6,453,731 B1 * | 9/2002 | Yaegashi .................... 73/114.52 |
| 8,260,534 B2 * | 9/2012 | Henderson et al. ........... 701/123 |
| 8,305,205 B2 * | 11/2012 | Kaneda ......................... 340/439 |
| 8,718,913 B2 * | 5/2014 | Crombez ...................... 701/123 |
| 2007/0247291 A1 | 10/2007 | Masuda et al. |
| 2007/0247975 A1 * | 10/2007 | Masuda et al. .................. 368/27 |
| 2009/0066495 A1 * | 3/2009 | Newhouse et al. ........... 340/439 |
| 2009/0251304 A1 * | 10/2009 | Saito et al. .................... 340/441 |
| 2011/0112719 A1 * | 5/2011 | Marumoto et al. ............ 701/35 |
| 2011/0205044 A1 * | 8/2011 | Enomoto et al. ............. 340/439 |
| 2011/0241864 A1 * | 10/2011 | Fujiki et al. .................. 340/439 |
| 2012/0065874 A1 * | 3/2012 | Sato et al. ..................... 701/123 |
| 2014/0167944 A1 * | 6/2014 | Yamaguchi ................... 340/439 |

FOREIGN PATENT DOCUMENTS

JP         2007-298494 A      11/2007

* cited by examiner

*Primary Examiner* — Rami Khatib
*Assistant Examiner* — Jeffrey Boomer
(74) *Attorney, Agent, or Firm* — Troutman Sanders LLP (57) ABSTRACT

A display device for a vehicle is provided in a vehicle having idling stop function and includes: a fuel economy display unit to display fuel economy information on the vehicle; an first fuel economy display unit to calculate a first fuel economy based on a distance traveled and fuel consumption in a first period; and a second fuel economy calculation unit to calculate an second fuel economy based on a distance traveled and fuel consumption in a second period shorter than the first period. The device also includes a display control unit to control display of the fuel economy display unit based on a fuel economy difference between the first and second fuel economies. When the second fuel economy reaches a reference value before performing idling stop, the fuel economy display control unit controls the fuel economy display unit based on the last fuel economy difference without updating the difference.

6 Claims, 7 Drawing Sheets

DISPLAY DEVICE FOR VEHICLE

CROSS-REFERENCE TO RELATED APPLICATIONS

The present application claims priority from Japanese Patent Application No. 2012-271865 filed on Dec. 13, 2012, the entire contents of which are hereby incorporated by reference.

BACKGROUND

1. Technical Field

The present invention relates to a display device for a vehicle, the display device having a fuel economy display unit.

2. Related Art

A vehicle having an idling stop function has been proposed in order to improve the fuel economy performance of the vehicle, the idling stop function causing the engine to stop automatically when the vehicle is stopped. In order to prompt a driving operation which improves fuel economy, a fuel economy display unit has been proposed, such as a fuel economy meter configured to display a fuel economy difference between the current instantaneous fuel economy and the past average fuel efficiency (see Japanese Unexamined Patent Application Publication No. 2007-298494). When the idling stop is performed, both the vehicle speed and the fuel consumption are zero, and thus an instantaneous fuel economy may not be calculated and display conditions for the fuel economy meter may not be determined. Thus, an approach has been proposed in which when the idling stop is performed, the fuel economy meter is controlled at a specific predetermined display state.

Controlling the fuel economy meter at a specific predetermined display state causes the display state of the fuel economy meter to be significantly changed in a process of shifting to the idling stop, thereby causing a driver to have a feeling of discomfort. In particular, a needle-type fuel economy meter having a needle is likely to give a driver a feeling of discomfort. For example, when the vehicle is stopped, idled, and is shifted to the idling stop, the needle swings out in a direction in which fuel economy reduces in the idling which consumes fuel, and the needle returns to a specific position (for example, the middle) as the idling stop is subsequently performed. Such an excessive operation of the needle of the fuel economy meter causes a driver to have a feeling of discomfort.

SUMMARY OF THE INVENTION

It is an object of the present invention to reduce an excessive operation of a fuel economy display unit.

An aspect of the present invention provides a display device for a vehicle configured to be provided in a vehicle having an idling stop function to cause an engine to stop. The display device includes: a fuel economy display unit to display fuel economy information on the vehicle; a first fuel economy calculation unit to calculate a first fuel economy based on a distance traveled and a fuel consumption in a first period; a second fuel economy calculation unit to calculate a second fuel economy based on a distance traveled and a fuel consumption in a second period that is shorter than the first period; and a display control unit to control the display of the fuel economy display unit based on a fuel economy difference between the first fuel economy and the second fuel economy. When the second fuel economy reaches a reference value before an idling stop is performed, the display control unit controls the fuel economy display unit based on the last fuel economy difference without updating the fuel economy difference. According to the present invention, when the second fuel economy reaches a reference value before idling stop is performed, the display control unit controls the fuel economy display unit based on the last fuel economy difference without updating the fuel economy difference.

DETAILED DESCRIPTION

Figure 1:
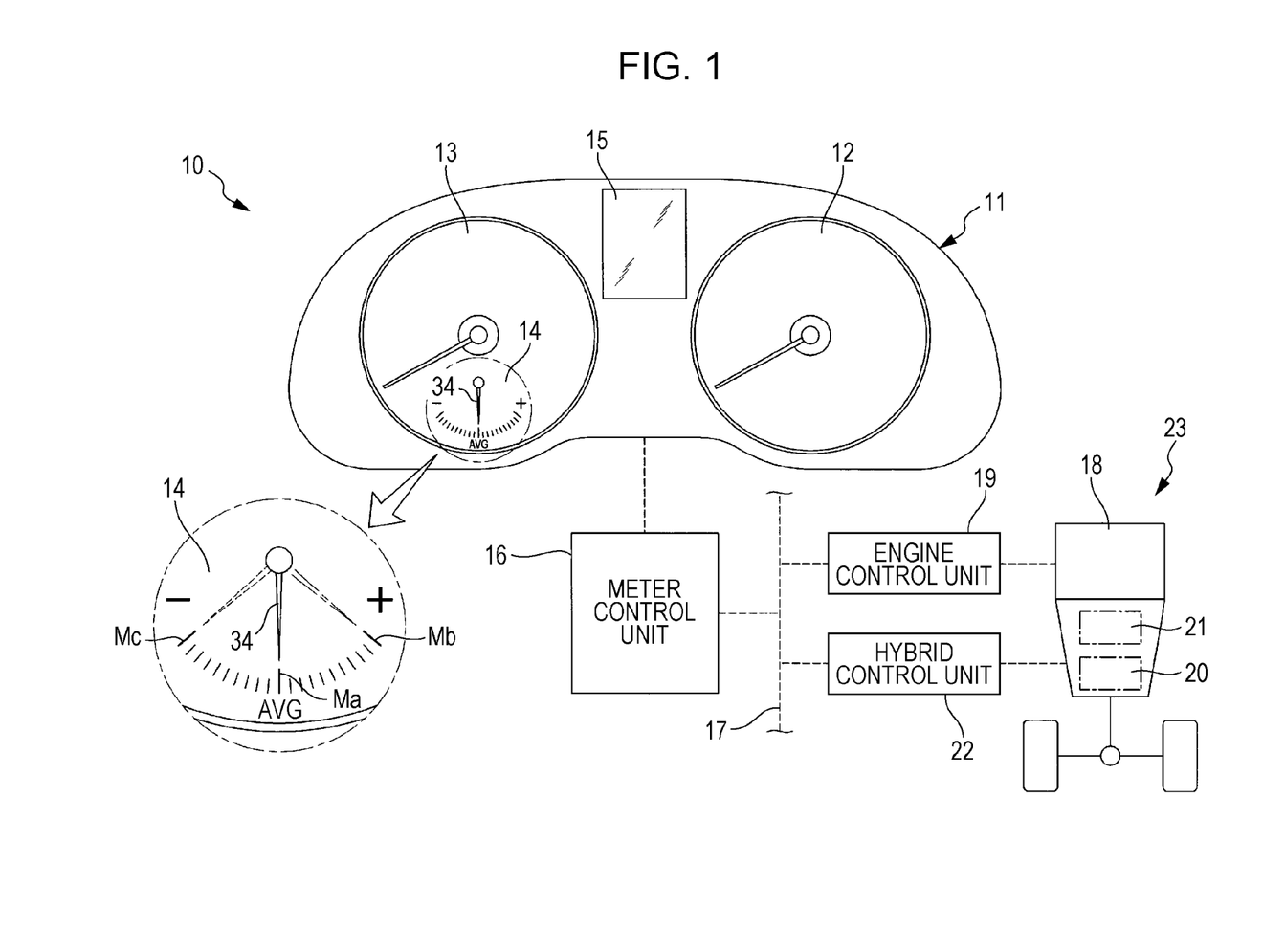
FIG. 1 is a schematic diagram illustrating the configuration of a display device for a vehicle according to an example of the present invention.

Hereinafter, an example of the present invention will be described in detail with reference to the drawings. FIG. 1 is a schematic diagram illustrating the configuration of a vehicle display device 10 according to an example of the present invention. As illustrated in FIG. 1, the vehicle display device 10 has a combination meter 11. The combination meter 11 includes a speedometer 12 for displaying a vehicle speed, a tachometer 13 for displaying the number of engine revolutions, a fuel economy meter 14 serving as the fuel economy display unit for displaying fuel economy information, and a display 15 for displaying various types of information. In addition, the vehicle display device 10 includes a meter control unit 16 for outputting a control signal to a component such as the fuel economy meter 14. The meter control unit 16 is connected via a communication network 17 to an engine control unit 19 for controlling an engine 18. In addition, the meter control unit 16 is connected via the communication network 17 to a hybrid control unit 22 for controlling components such as a transmission 20 and an electric motor 21. The meter control unit 16 receives information from the engine control unit 19, such as a fuel consumption which is a fuel injection amount of an injector (not illustrated), and the number of engine revolutions which is the number of revolutions of a crankshaft (not illustrated). In addition, the meter control unit 16 receives information from the hybrid control unit 22, such as a vehicle speed which is the running speed of a vehicle 23, and a mode signal which indicates a currently set vehicle mode. The control units 16, 19 and 22 each include a CPU to calculate a control signal and the like, a ROM for storing control programs, arithmetic expressions, map data or the like, and a RAM for storing data temporarily.

The vehicle 23 having the above-described vehicle display device 10 is a hybrid vehicle including the engine 18 and the electric motor 21 as a drive source. The vehicle 23 has an idling stop function. When a predetermined stop condition is satisfied, the engine 18 is automatically stopped, whereas when a predetermined start condition is satisfied, the engine 18 is automatically restarted. The stop condition for the engine 18 is, for example, that the vehicle speed is "0 km/h" and the brake pedal is depressed. The start condition for the engine 18 is, for example, that the depressed brake pedal is released or that the accelerator pedal is depressed. In the following description, engine stop by the idling stop function is referred to as idling stop.

Figure 2:
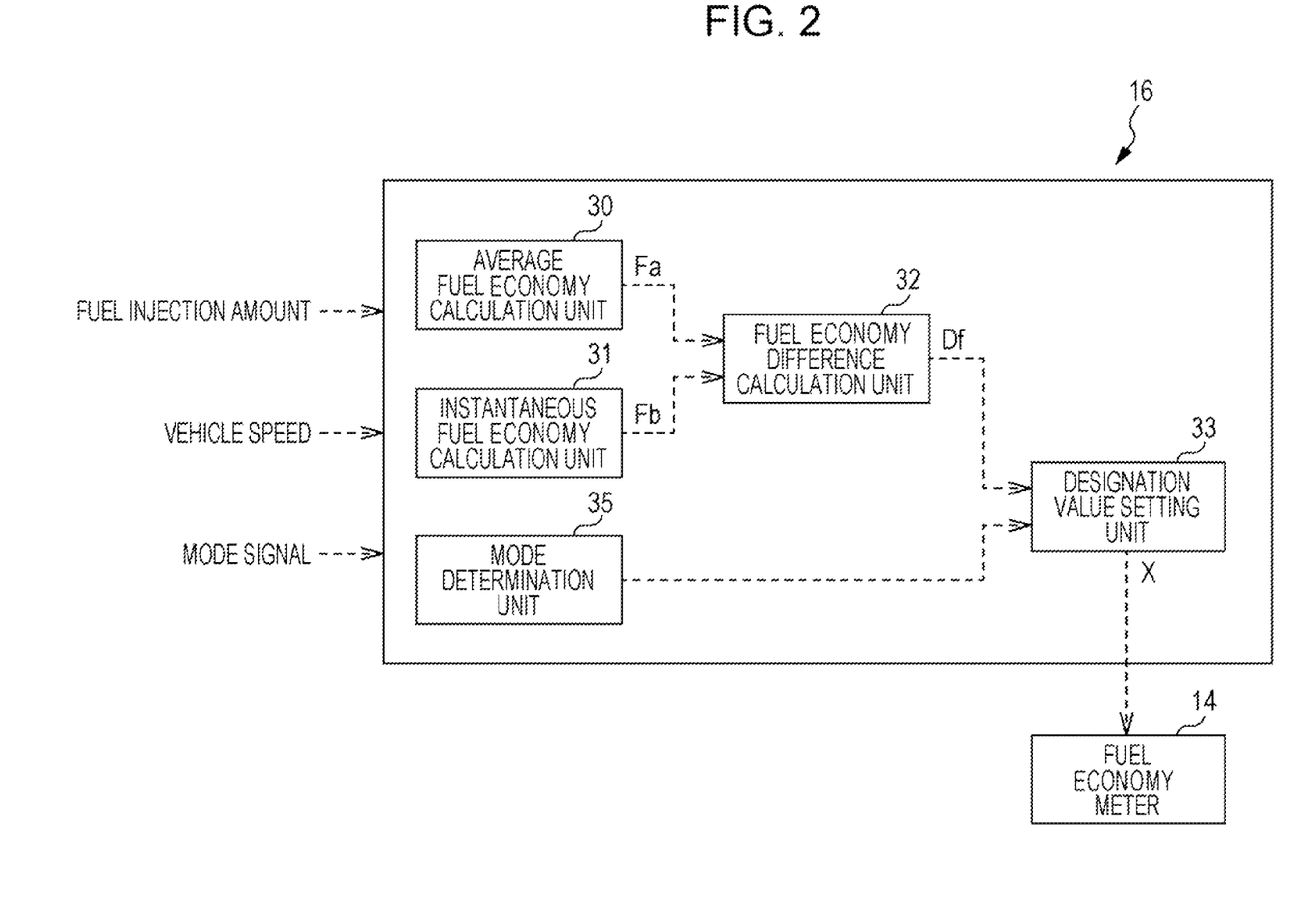
FIG. 2 is a block diagram schematically illustrating the configuration of a meter control unit.

FIG. 2 is a block diagram schematically illustrating the configuration of the meter control unit 16. As illustrated in FIG. 2, the meter control unit 16 has an average fuel economy calculation unit 30 which serves as the first fuel economy calculation unit. The average fuel economy calculation unit 30 calculates the distance traveled during a first period based on the vehicle speed. In addition, the average fuel economy calculation unit 30 calculates an average fuel economy Fa as the first fuel economy at every predetermined calculation timing based on the distance traveled and the fuel injection amount during the first period. The first period is, for example, a period from when the ignition switch is turned on to a current time, or a period from when a trip meter which add ups the distances traveled is reset to the current time. The first period may be set to a most recent predetermined time period such as the most recent 10 minutes, the most recent 1 hour, and the most recent 10 hours.

The meter control unit 16 has an instantaneous fuel economy calculation unit 31 which serves as the second fuel economy calculation unit. The instantaneous fuel economy calculation unit 31 calculates the distance traveled during a second period based on the vehicle speed. The instantaneous fuel economy calculation unit 31 calculates an instantaneous fuel economy Fb as the second fuel economy at every predetermined calculation timing based on the distance traveled and the fuel injection amount during the second period. The second period is, for example, the most recent 0.1 second or the most recent 1 second. In this manner, The second period in which the instantaneous fuel economy Fb is calculated is set so as to be shorter than the first period in which the above-mentioned average fuel economy Fa is calculated. In the above description, the distance traveled during each of the first period and the second period is calculated based on the vehicle speed. However, the present invention is not limited to this, and the distance traveled may be calculated based on, for example, a position signal from a global positioning system (GPS).

In this example, the average fuel economy Fa and the instantaneous fuel economy Fb are each calculated in terms of the distance traveled per consumption of a predetermined fuel injection amount. The unit of the average fuel economy Fa and the instantaneous fuel economy Fb is, for example, "km/L" or "mile/gallon." When each fuel economy is calculated in terms of distance traveled per consumption of a predetermined fuel injection amount in this manner, a higher value of the fuel economy indicates better fuel economy and a lower value of the fuel economy indicates worse fuel economy. The average fuel economy Fa and the instantaneous fuel economy Fb each may be calculated in terms of fuel injection amount consumed over a predetermined distance traveled. The unit of the average fuel economy Fa and the instantaneous fuel economy Fb is, for example, "L/100 km." When each fuel economy is calculated in terms of fuel injection amount consumed over a predetermined distance traveled in this manner, a higher value of the fuel economy indicates worse fuel economy and a lower value of the fuel economy indicates better fuel economy. It is to be noted that the fuel economy herein refers to a fuel consumption rate.

The calculation range of the average fuel economy Fa and the instantaneous fuel economy Fb is no smaller than zero nor greater than infinity ($\infty$). That is to say, the minimum value of the calculation range of the average fuel economy Fa and the instantaneous fuel economy Fb is zero and the maximum value thereof is infinite. The calculation range of the average fuel economy Fa and the instantaneous fuel economy Fb is not limited to the above-mentioned range. The lower limit value of the calculation range, that is, the minimum value of the range may be set to a value other than zero, and the upper limit value of the calculation range, that is, the maximum value of the range may be set to a value other than infinity.

The meter control unit 16 has a fuel economy difference calculation unit 32 and a designation value setting unit 33. The fuel economy difference calculation unit 32 calculates a fuel economy difference Df at every predetermined calculation timing based on the average fuel economy Fa and the instantaneous fuel economy Fb. The designation value setting unit 33 sets a meter designation value X at every predetermined set timing based on the fuel economy difference Df. The designation value setting unit 33 outputs the meter designation value X to an actuator (not illustrated) of the fuel economy meter 14, and the fuel economy meter 14, which is a needle-type meter, operates a needle 34 based on the meter designation value X. In this manner, the fuel economy difference calculation unit 32 and the designation value setting unit 33, which serve as the display control unit, control the display of the fuel economy meter 14 based on the fuel economy difference Df.

Figure 3:
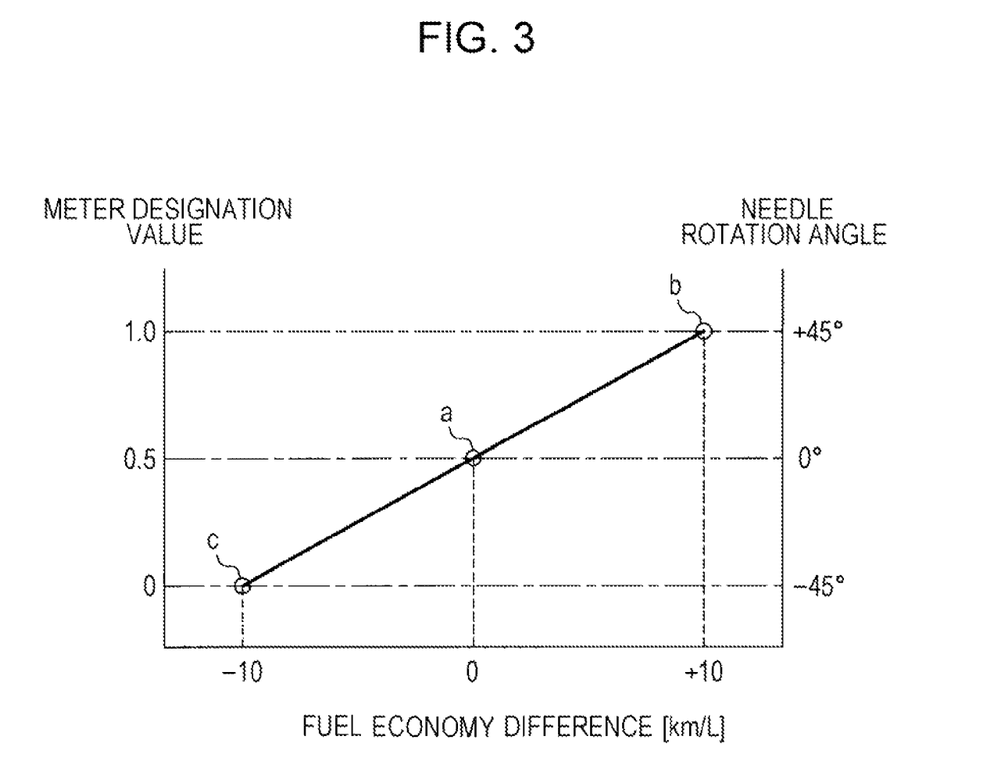
FIG. 3 is a graph illustrating an example of the relationship between the operational position of a needle and fuel economy difference.

FIG. 3 is a graph illustrating an example of the relationship between the operational position of the needle 34 and fuel economy difference Df. When the fuel economy difference Df is calculated to be "0 km/L" by the fuel economy difference calculation unit 32 as indicated by a reference symbol a in FIG. 3, and the meter designation value X is set to "0.5" by the designation value setting unit 33. The meter designation value X of "0.5" corresponds to a needle rotation angle of "0°", and by setting the meter designation value X to "0.5", the needle 34 indicates the middle position Ma of the scale as indicated by a solid line in an enlarged portion in FIG. 1. Thus, in running condition where the instantaneous fuel economy Fb is calculated to be the same value as the average fuel economy Fa, that is, the average fuel economy Fa is maintained, the needle 34 of the fuel economy meter 14 indicates the middle position Ma of the scale. In other words, when the fuel economy difference Df is zero, the needle 34 is operated to indicate the middle position Ma which is the reference position.

As indicated by a reference symbol b in FIG. 3, when the fuel economy difference Df is calculated to be the positive value of "10 km/L" by the fuel economy difference calculation unit 32, the meter designation value X is set to "1" by the designation value setting unit 33. The meter designation value X of "1" corresponds to a needle rotation angle of "+45°", and by setting the meter designation value X to "1", the needle 34 indicates the maximum position Mb on the positive side of the scale as indicated by a dashed dotted line in the enlarged portion in FIG. 1. Thus, in running condition where the instantaneous fuel economy Fb exceeds the average fuel economy Fa, that is, the average fuel economy Fa increases, the needle 34 indicates a position on the positive side of the scale, that is, a position between the middle position Ma and one end of the scale.

Subsequently, as indicated by a symbol c in FIG. 3, when the fuel economy difference Df is calculated to be the positive value of "−10 km/L" by the fuel economy difference calculation unit 32, the meter designation value X is set to "0" by the designation value setting unit 33. The meter designation value X of "0" corresponds to a needle rotation angle of "−45°", and by setting the meter designation value X to "0", the needle 34 indicates the maximum position Mc on the negative side of the scale as indicated by a dashed line in the enlarged portion in FIG. 1. Thus, in running condition where the instantaneous fuel economy Fb falls below the average fuel economy Fa, that is, the average fuel economy Fa decreases, the needle 34 indicates a position on the negative side of the scale, that is, a position between the middle position Ma and the other end of the scale.

The hybrid control unit 22 serves as the mode setting unit, and outputs a mode signal to the meter control unit 16. The hybrid control unit 22 sets one vehicle mode out of multiple vehicle mode options according to a vehicle state such as a vehicle speed, a requested drive torque, and a battery charging state. The vehicle mode options include an idling mode in which the engine 18 is idled when the vehicle is stopped and an idling stop mode in which the engine 18 is stopped when the vehicle is stopped. The vehicle mode options also include a motor assist mode in which the engine 18 and the electric motor 21 are driven for running the vehicle, an EV driving mode in which the electric motor 21 is driven for power running with the engine stopped, and an EV regeneration mode in which the electric motor 21 is driven for power generation with the engine stopped. Furthermore, the vehicle mode options include an engine drive mode in which the engine 18 is driven for running the vehicle with the motor stopped, and an engine power generation mode in which the electric motor 21 is driven for power generation with the power of the engine.

The motor assist mode, the EV driving mode, and the EV regeneration mode out of the above-described vehicle mode options are an idling stop driving mode in which idling stop is performed when the vehicle is stopped. That is to say, in a state where the motor assist mode, the EV driving mode, or the EV regeneration mode is set, the driving mode is switched to the idling stop mode when the vehicle is stopped. In other words, the state in which the idling stop driving mode is set is a state where idling stop has not been performed yet but is to be performed when the vehicle is stopped. It is to be noted that the idling stop driving mode is not limited to the motor assist mode, the EV driving mode, or the EV regeneration mode described above, and another driving mode may be set as an idling stop driving mode.

As illustrated in FIG. 2, the meter control unit 16 has a mode determination unit 35 to determine the currently set vehicle mode based on the mode signal from the hybrid control unit 22. Information on the vehicle mode determined by the mode determination unit 35 is sent to the designation value setting unit 33 which sets the meter designation value X. The designation value setting unit 33 has a function of setting the meter designation value X based on not only the above-described fuel economy difference Df but also the information on the determined vehicle mode. That is to say, the meter control unit 16 controls the display of the fuel economy meter 14 based on the fuel economy difference Df and the vehicle mode.

Figure 4:
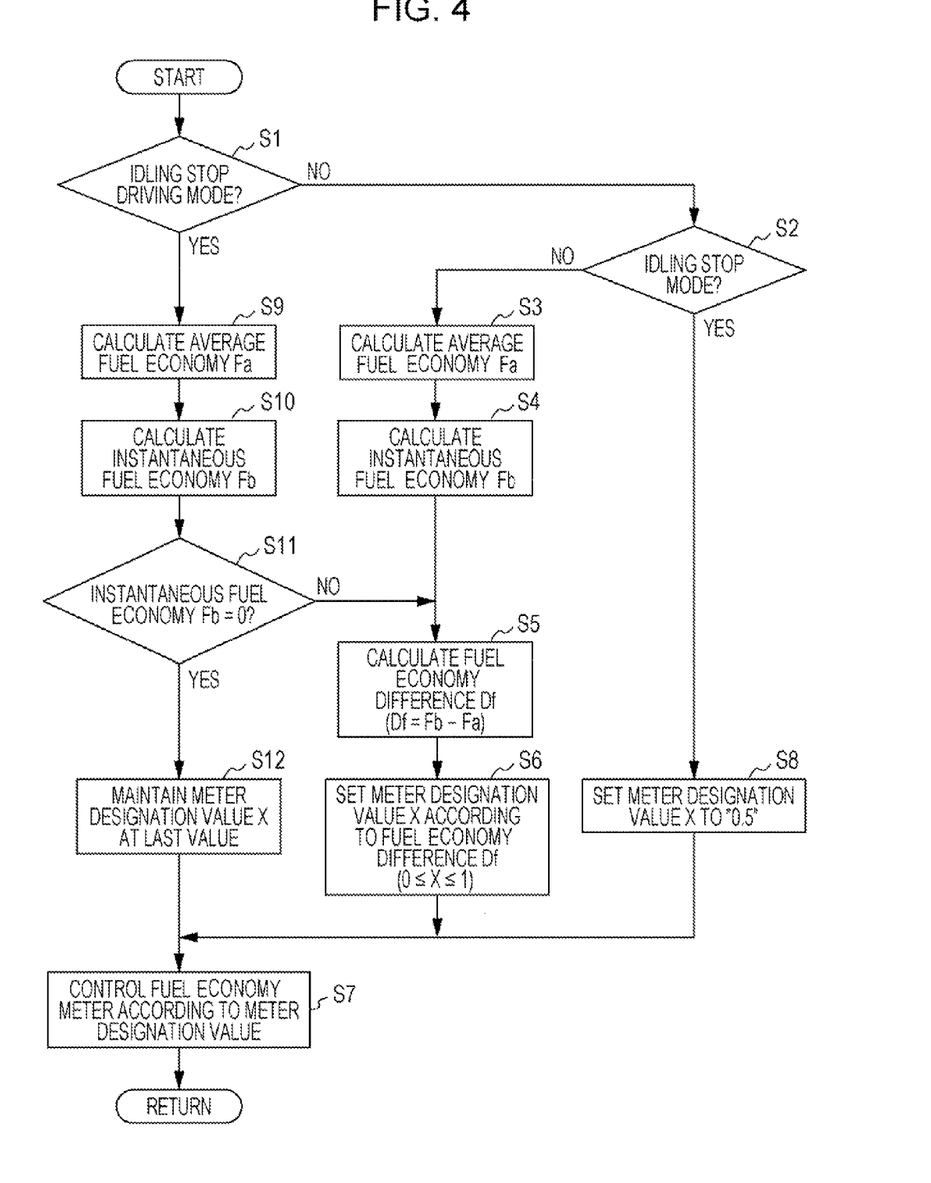
FIG. 4 is a flow chart illustrating a procedure of controlling a fuel economy meter.

Hereinafter, a procedure of controlling the fuel economy meter 14 by the meter control unit 16 will be described. FIG. 4 is a flow chart illustrating an example of a procedure of controlling the fuel economy meter 14. In step S1, the meter control unit 16 determines whether or not the current vehicle mode is the idling stop driving mode. As described above, the idling stop driving mode is one of the driving modes including the motor assist mode, the EV driving mode, and the EV regeneration mode, and also is a vehicle mode in which idling stop is performed when the vehicle is stopped. If it is determined in step S1 that the idling stop driving mode is not set, the process proceeds to step S2 to determine whether or not the current vehicle mode is the idling stop mode.

If it is determined in step S2 that the idling stop mode is not set, that is to say, if it is determined that one of the idling mode, the engine drive mode, and the engine power generation mode is set, the process proceeds to step S3 where the average fuel economy Fa is calculated, and then to step S4 where the instantaneous fuel economy Fb is calculated. Subsequently, in step S5, the fuel economy difference Df is calculated by subtracting the average fuel economy Fa from the instantaneous fuel economy Fb, and in step S6, the meter designation value X is set based on the fuel economy difference Df. The process then proceeds to step S7 where the needle 34 of the fuel economy meter 14 is controlled based on the meter designation value X. Thus, the meter designation value X is set to a value in the range from zero to one based on the fuel economy difference Df which is updated at every predetermined calculation timing, and the needle 34 of the fuel economy meter 14 is controlled to be on the positive side or the negative side.

On the other hand, if it is determined in step S2 that the current vehicle mode is the idling stop mode, the process proceeds to step S8 where the meter designation value X is set to "0.5." In the subsequent step S7, the needle 34 of the fuel economy meter 14 is controlled at the middle position Ma. While the idling stop is performed, both the distance traveled and the fuel injection amount are zero and the average fuel economy Fa is not affected at all. Therefore, the needle 34 of the fuel economy meter 14 is controlled to indicate the middle position Ma.

If it is determined in step S1 that the idling stop driving mode is set, the process proceeds to step S9 and the average fuel economy Fa is calculated. The process then proceeds to step S10 where the instantaneous fuel economy Fb is calculated. Subsequently, in step S11, it is determined whether or not the instantaneous fuel economy Fb is reduced to the minimum value of the calculation range, that is, the reference value of zero. If it is determined in step S11 that the instantaneous fuel economy Fb has reached zero, the process proceeds to step S12, where the last meter designation value X is not updated but maintained. The process then proceeds to step S7 where the needle 34 of the fuel economy meter 14 is controlled based on the last meter designation value X. On the other hand, if it is determined in step S11 that the instantaneous fuel economy Fb is greater than zero, the process proceeds to step S5 where the fuel economy difference Df is calculated by subtracting the average fuel economy Fa from the instantaneous fuel economy Fb. Subsequently, the process proceeds to step S6 where the meter designation value X is set based on the fuel economy difference Df. The process proceeds to step S7 where the needle 34 of the fuel economy meter 14 is controlled based on the meter designation value X.

If it is determined that the instantaneous fuel economy Fb is zero with the idling stop driving mode set, the last meter designation value X is not updated but maintained. That is to say, if it is determined that the instantaneous fuel economy Fb has reached the minimum value of the calculation range with the idling stop driving mode set, the last fuel economy difference Df is not updated but maintained. In this manner, the needle 34 of the fuel economy meter 14 is not excessively operated, thereby preventing the driver from having a feeling of discomfort.

That is to say, if the instantaneous fuel economy Fb is calculated to be zero and the fuel economy meter 14 is controlled according to the instantaneous fuel economy Fb, the needle 34 of the fuel economy meter 14 indicates the maximum position Mc on the negative side. However, if the idling stop driving mode is set, the current vehicle mode is subsequently shifted to the idling stop mode, and thus the needle 34 of the fuel economy meter 14 moves from the maximum position Mc to the middle position Ma. In this manner, the needle 34 of the fuel economy meter 14 significantly swings in a short time. However, if the instantaneous fuel economy Fb is zero, the last meter designation value X is maintained, and thus rotation of the needle 34 to the maximum position Mc can be prevented. Therefore, excessive rotation of the needle 34 is prevented, thereby preventing the driver from having a feeling of discomfort.

Figure 5:
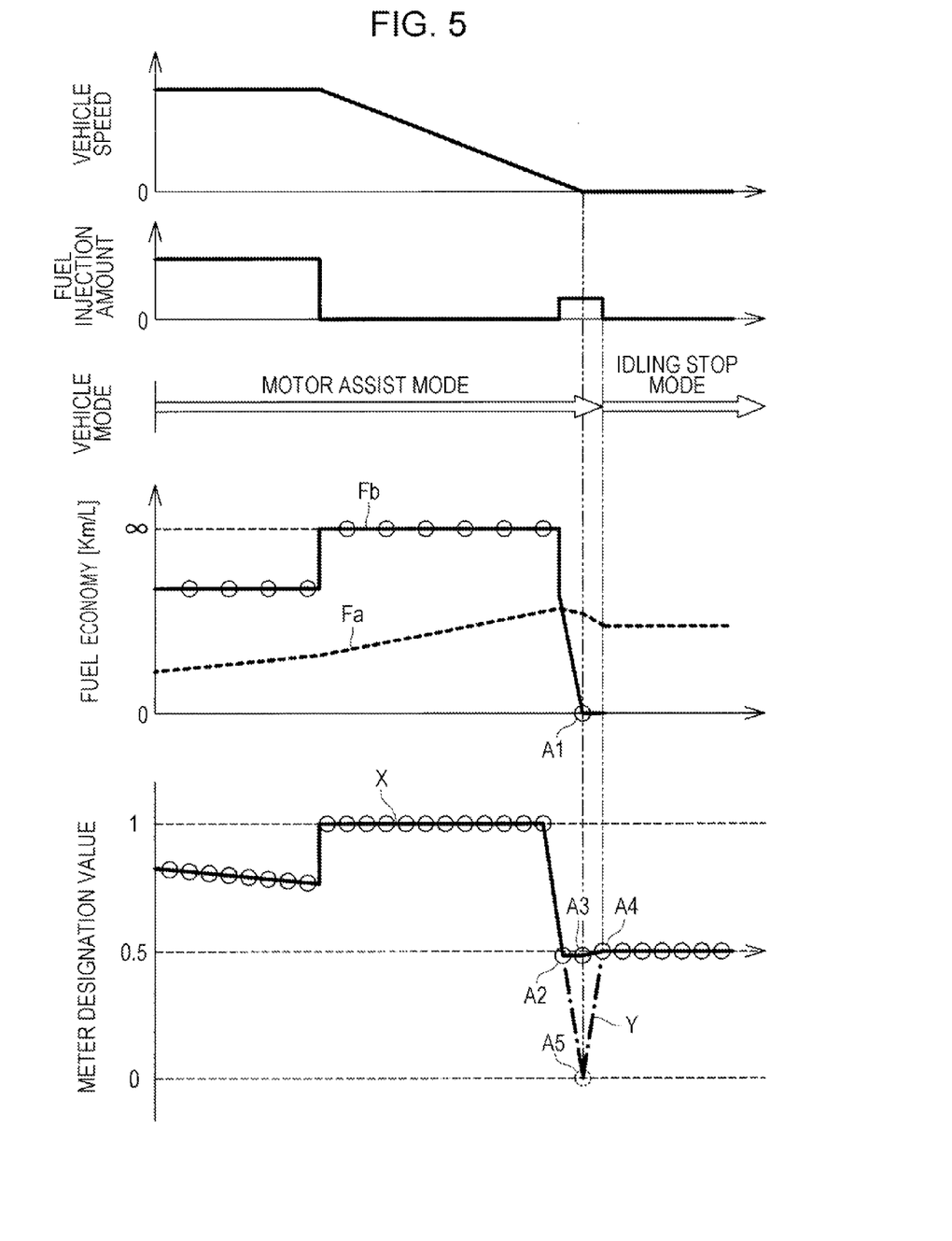
FIG. 5 is a timing chart illustrating an example of setting conditions for a meter designation value when the current vehicle mode is changed from a motor assist mode to an idling stop mode.
Figure 6:
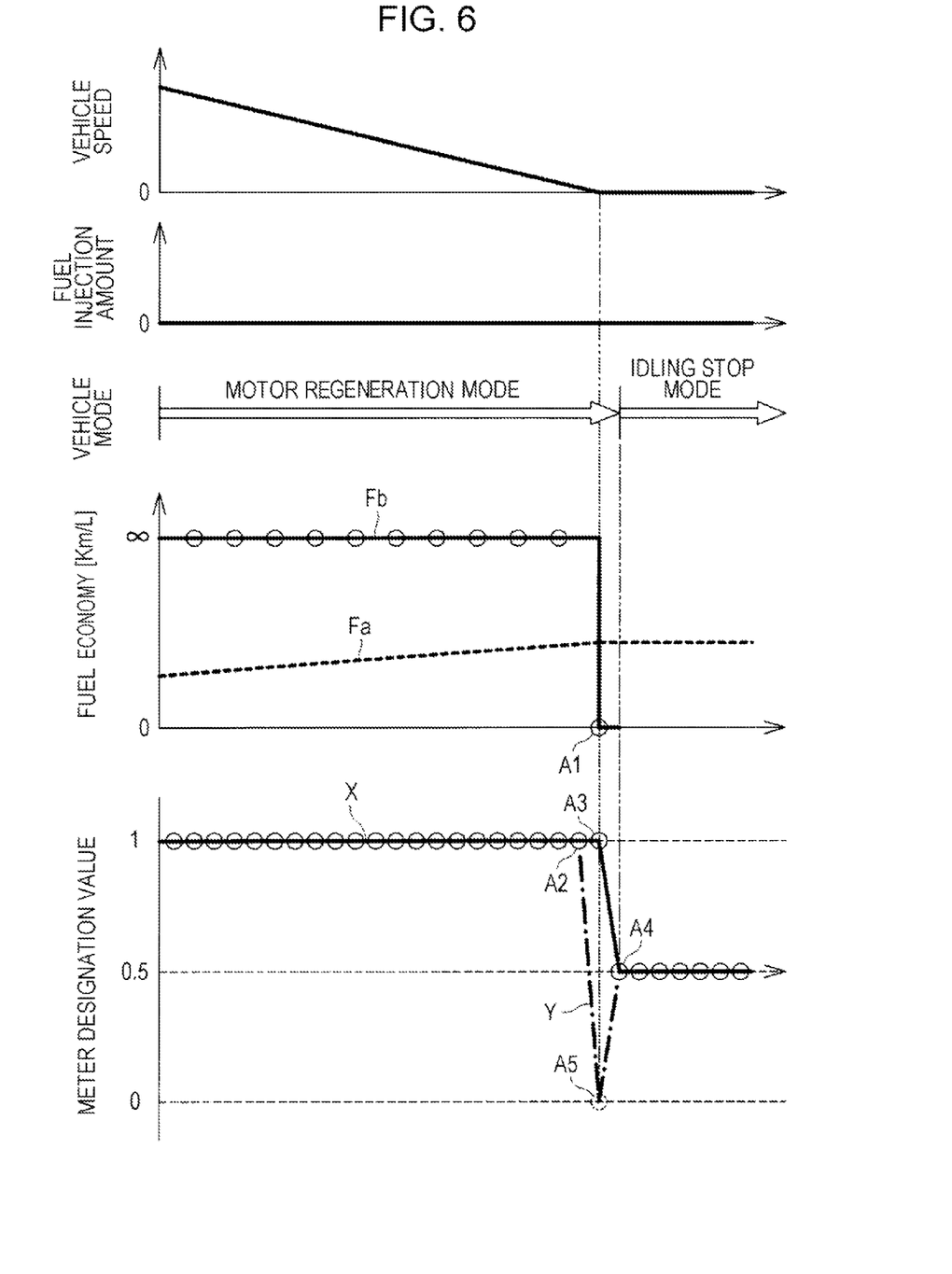
FIG. 6 is a timing chart illustrating an example of setting conditions for a meter designation value when the current vehicle mode is changed from EV regeneration mode to an idling stop mode.

Hereinafter, setting conditions for the meter designation value X will be described with reference to timing charts. FIG. 5 is a timing chart illustrating an example of setting conditions for the meter designation value X when the current vehicle mode is changed from the motor assist mode to the idling stop mode. FIG. 6 is a timing chart illustrating an example of setting conditions for the meter designation value X when the current vehicle mode is changed from the EV regeneration mode to the idling stop mode. Each of the symbols ○ illustrated in FIGS. 5 and 6 indicates a calculation timing for the instantaneous fuel economy Fb or a setting timing for the meter designation value X.

Firstly, the setting conditions for the meter designation value X when the current vehicle mode is shifted from the motor assist mode to the idling stop mode will be described. As illustrated in FIG. 5, in the motor assist mode in which the engine 18 is in an operational state, the average fuel economy Fa and the instantaneous fuel economy Fb are calculated based on the vehicle speed and the fuel injection amount, and the meter designation value X is set based on the average fuel economy Fa and the instantaneous fuel economy Fb. When the vehicle is coasting after a depressed accelerator pedal is released, fuel injection from the injector is stopped, and thus the fuel injection amount becomes zero and the instantaneous fuel economy Fb is calculated to be infinite. Subsequently, the meter designation value X is set to one and the needle 34 of the fuel economy meter 14 is controlled at the maximum position Mb. Fuel injection is then resumed immediately before the vehicle is stopped and fuel injection is stopped again after the vehicle is stopped.

When the vehicle is stopped and the current vehicle mode is shifted accordingly from the motor assist mode to the idling stop mode, the instantaneous fuel economy Fb is calculated to be zero with the vehicle stopped as indicated by symbol A1 in FIG. 5. Thus, the last meter designation value X is not updated but maintained as indicated by symbols A2 and A3. When it is determined that the current vehicle mode is shifted to the idling stop mode, the meter designation value X is set to 0.5 correspondingly to the idling stop as indicated by symbol A4. That is to say, when the meter designation value X is updated as the instantaneous fuel economy Fb is calculated to be 0zero the meter designation value X is set to zero as indicated by symbol A5. Thus, the meter designation value X significantly changes in a short time as indicated by dashed dotted line Y. However, by maintaining but instead of updating the meter designation value X, that is, by maintaining instead of updating the fuel economy difference Df, the rotation angle of the meter designation value X can be reduced, and thus excessive operation of the fuel economy meter 14 can be prevented.

Hereinafter, the setting conditions for the meter designation value X when the current vehicle mode is shifted from the EV regeneration mode to the idling stop mode will be described. As illustrated in FIG. 6, in the EV regeneration mode in which the engine 18 is in a stopped state, the fuel injection amount becomes zero, and thus the instantaneous fuel economy Fb is calculated to be infinite. Consequently, the meter designation value X is set to one and the needle 34 of the fuel economy meter 14 is controlled at the maximum position Mb on the positive side. When the vehicle is stopped and the current vehicle mode is shifted from the EV regeneration mode to the idling stop mode, the instantaneous fuel economy Fb is calculated to be 0 with the vehicle stopped as indicated by symbol A1 in FIG. 6. Thus, the last meter designation value X is not updated but maintained as indicated by symbols A2 and A3. When it is determined that the current vehicle mode is shifted to the idling stop mode, the meter designation value X is set to 0.5 correspondingly to the idling stop as indicated by symbol A4. That is to say, when the meter designation value X is updated as the instantaneous fuel economy Fb is calculated to be zero, the meter designation value X is set to zero as indicated by symbol A5. Thus, the meter designation value X significantly changes in a short time as indicated by dashed dotted line Y. However, by maintaining instead of updating the meter designation value X, that is, by maintaining instead of updating the fuel economy difference Df, the rotation angle of the meter designation value X can be reduced, and thus excessive operation of the fuel economy meter 14 can be prevented.

Figure 7A:
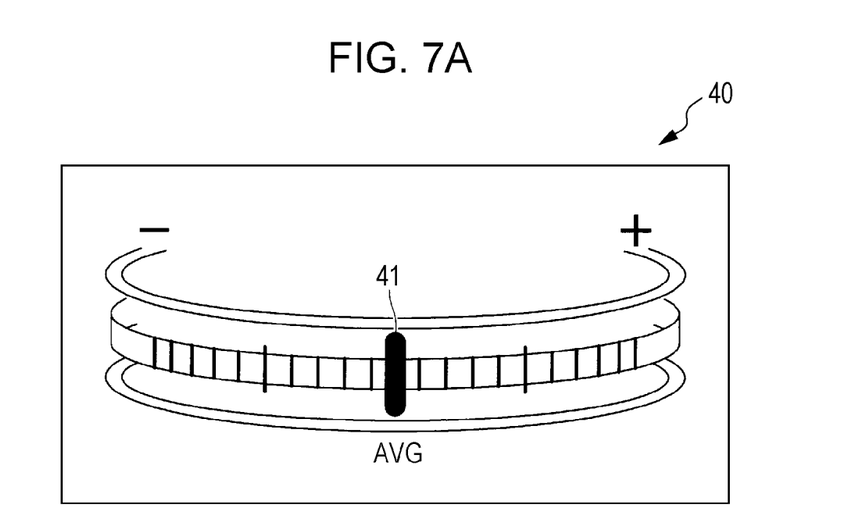
FIGS. 7A to 7C are an explanatory views illustrating a fuel economy display unit in other forms.
Figure 7B:
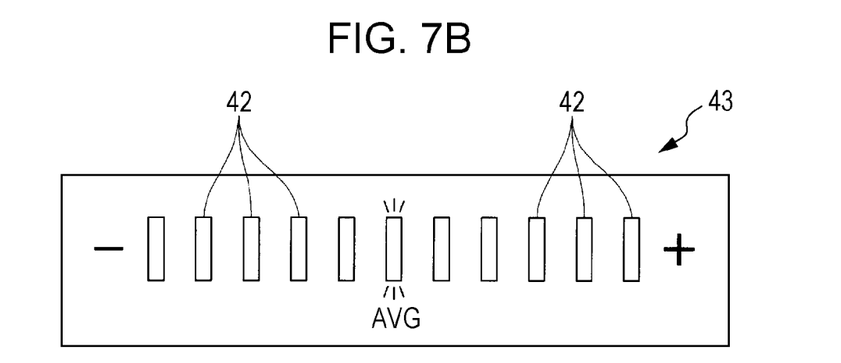
Figure 7C:
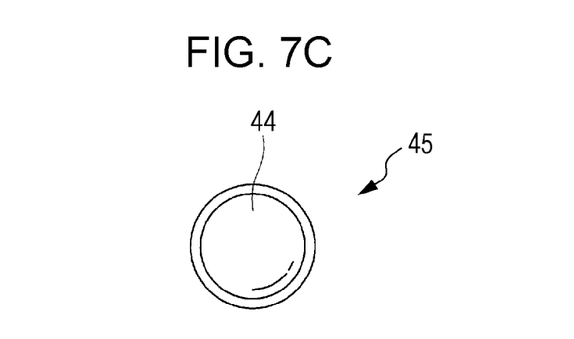

In the above description, the analog fuel economy meter 14 is used as a fuel economy display unit for displaying the fuel economy difference Df which is fuel economy information, and configured to operate the needle 34 by an actuator such as a stepping motor. However, the fuel economy display unit of the present invention is not limited to the analog fuel economy meter 14. FIGS. 7A to 7C are each an explanatory view illustrating a fuel economy display unit in another form. As illustrated in FIG. 7A, a digital fuel economy meter 40 may be used as a fuel economy display unit. The fuel economy meter 40 is a fuel economy meter which is displayed on, for example, a liquid crystal display or an organic electroluminescence display, and is a needle-type meter having a needle 41 displayed on the display. Similarly to the above-described fuel economy meter 14, in the fuel economy meter 40, the fuel economy difference Df as fuel economy information can be displayed by moving the needle 41 to the positive side or the negative side based on the above-described meter designation value X.

The fuel economy display unit is not limited to a needle-type meter having the needle 34 or 41, and may be a fuel economy meter which displays fuel economy information by another method. The fuel economy display unit may be a fuel economy meter 43 in which multiple luminous bodies 42 are disposed in a single row as illustrated in FIG. 7B. On the fuel economy meter 43, the fuel economy difference Df as fuel economy information can be displayed by switching between the luminous bodies 42 which illuminate based on the above-described meter designation value X. As illustrated in FIG. 7C, the fuel economy display unit may be a fuel economy display unit 45 having a single luminous body 44. On the fuel economy display unit 45, the fuel economy difference Df as fuel economy information can be displayed by changing the color and/or the blinking pattern of the luminous body 44 based on the above-described meter designation value X.

The present invention is not limited to the above-described example, and it is needless to say that various modifications may be made within a range not departing from the spirit of the invention. In the above description, the vehicle 23 having the vehicle display device 10 is a hybrid vehicle, but is not limited to the hybrid vehicle, and the display device for a vehicle according to the present invention may be applied to a vehicle having only the engine 18 as a power source.

In the above description, the instantaneous fuel economy Fb is calculated in terms of distance traveled per consumption of a predetermined fuel injection amount, thus the reference value used for maintaining the fuel economy difference Df is set to the minimum value of the calculation range. However, the reference value is not limited to the minimum value. For example, when the instantaneous fuel economy Fb is calculated in terms of fuel injection amount consumed over a predetermined distance traveled, the reference value used for maintaining the fuel economy difference Df may be set to the maximum value of the calculation range.

In the above description, if it is determined that the current vehicle mode is the idling stop mode, that is, if the idling stop is performed, the needle 34 of the fuel economy meter 14 is operated to indicate the middle position Ma. However, the configuration is not limited to this. For example, if the idling stop is performed, the needle 34 may be operated to indicate a predetermined position on the positive side or a predetermined position on the negative side.

In the above description, the hybrid control unit 22 serves as the mode setting unit of the present invention, however, without being limited to this, the meter control unit 16 may serve as the mode setting unit. It is to be noted that the first fuel economy calculation unit, the second fuel economy calculation unit, the display control unit, and the mode setting unit may be integrated into one control unit or multiple control units separately.

In the above description, whether or not idling stop has been performed yet is determined based on the setting conditions for the idling stop driving mode. However, the configuration is not limited to this. For example, it may be determined that idling stop has not been performed yet when the vehicle speed falls below a predetermined value. In the above description, one of the conditions for stopping the engine 18 by the idling stop function is that the vehicle speed is "0 km/h", however, without being limited to this, it is needless to say that the idling stop may be performed during traveling of the vehicle immediately before the vehicle is stopped.

The invention claimed is:

1. A display device for a vehicle configured to be provided in a vehicle having an idling stop function to cause an engine to stop, the display device comprising:
    a fuel economy display unit to display fuel economy information on the vehicle;
    a first fuel economy calculation unit to calculate a first fuel economy based on a distance traveled and a fuel consumption in a first period;
    a second fuel economy calculation unit to calculate a second fuel economy based on a distance traveled and a fuel consumption in a second period that is shorter than the first period; and
    a display control unit configured to control the display of the fuel economy display unit based on a fuel economy difference between the first fuel economy and the second fuel economy,
    wherein when the second fuel economy reaches a reference value before idling stop is performed, the display control unit controls the fuel economy display unit based on a last fuel economy difference without updating the fuel economy difference,
    wherein the reference value is a minimum value or a maximum value in a calculation range of the second fuel economy.

2. The display device for a vehicle according to claim 1, wherein
    the fuel economy display unit is a needle-type meter having a needle;
    when the fuel economy difference is zero, the display control unit operates the needle to indicate a reference position;
    when the fuel economy difference is calculated to be a positive value, the display control unit operates to move the needle from the reference position to one side; and
    when the fuel economy difference is calculated to be a negative value, the display control unit operates to move the needle from the reference position to the other side.

3. The display device for a vehicle according to claim 2, wherein the display control unit operates the needle to indicate the reference position when idling stop is performed.

4. The display device for a vehicle according to claim 1, further comprising: a mode setting unit configured to set an idling stop driving mode in which idling stop is performed according to a state of the vehicle when the vehicle is stopped,
    wherein the idling stop driving mode is set before the idling stop is performed.

5. The display device for a vehicle according to claim 2, further comprising: a mode setting unit configured to set an idling stop driving mode in which idling stop is performed according to a state of the vehicle when the vehicle is stopped,
    wherein the idling stop driving mode is set before the idling stop is performed.

6. The display device for a vehicle according to claim 3, further comprising: a mode setting unit configured to set an idling stop driving mode in which idling stop is performed according to a state of the vehicle when the vehicle is stopped,
    wherein the idling stop driving mode is set before the idling stop is performed.

* * * * *